United States Patent [19]

Scaduto

[11] 4,128,026

[45] Dec. 5, 1978

[54] TOOL HOLDER

[76] Inventor: John R. Scaduto, 14460 E. State Fair, Detroit, Mich. 48205

[21] Appl. No.: 643,691

[22] Filed: Dec. 23, 1975

[51] Int. Cl.² .............................................. B23B 5/00
[52] U.S. Cl. ...................................................... 82/11
[58] Field of Search ............................... 82/11, DIG. 3

[56] References Cited

U.S. PATENT DOCUMENTS

| 2,441,533 | 5/1948 | Montgomery | 82/11 |
| 2,495,291 | 1/1950 | Schlitters | 82/11 |
| 2,521,619 | 9/1950 | Weld | 82/DIG. 3 |
| 3,451,308 | 6/1969 | Zeller et al. | 82/11 |

Primary Examiner—Leonidas Vlachos
Attorney, Agent, or Firm—Harness, Dickey & Pierce

[57] ABSTRACT

The disclosure pertains to a tool holding device for accurately locating a cutting tool relative to a workpiece and thereafter advancing the tool into the workpiece to a predetermined depth during a continuous advancing movement of the tool holding device.

1 Claim, 10 Drawing Figures

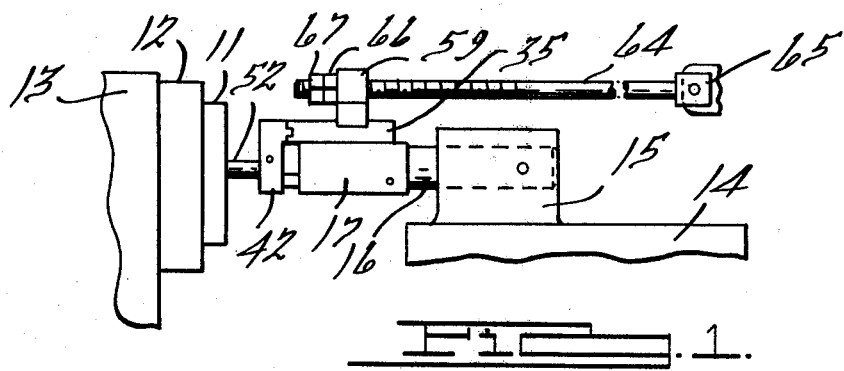
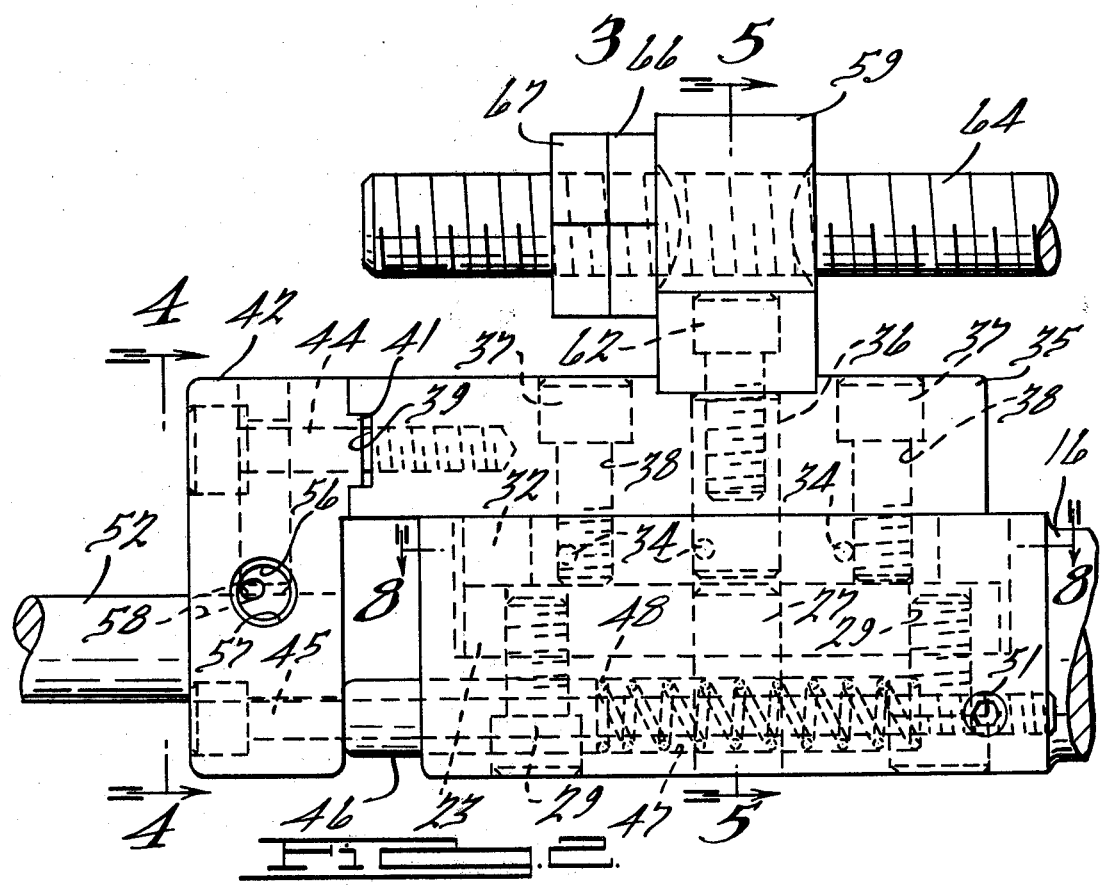

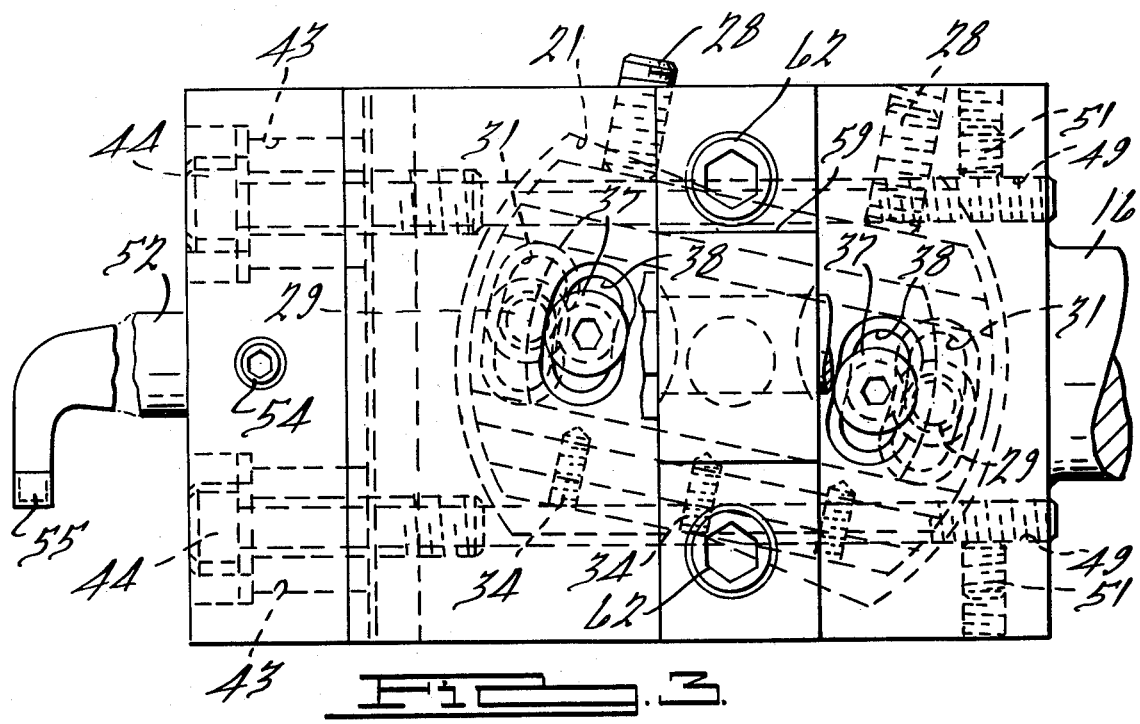
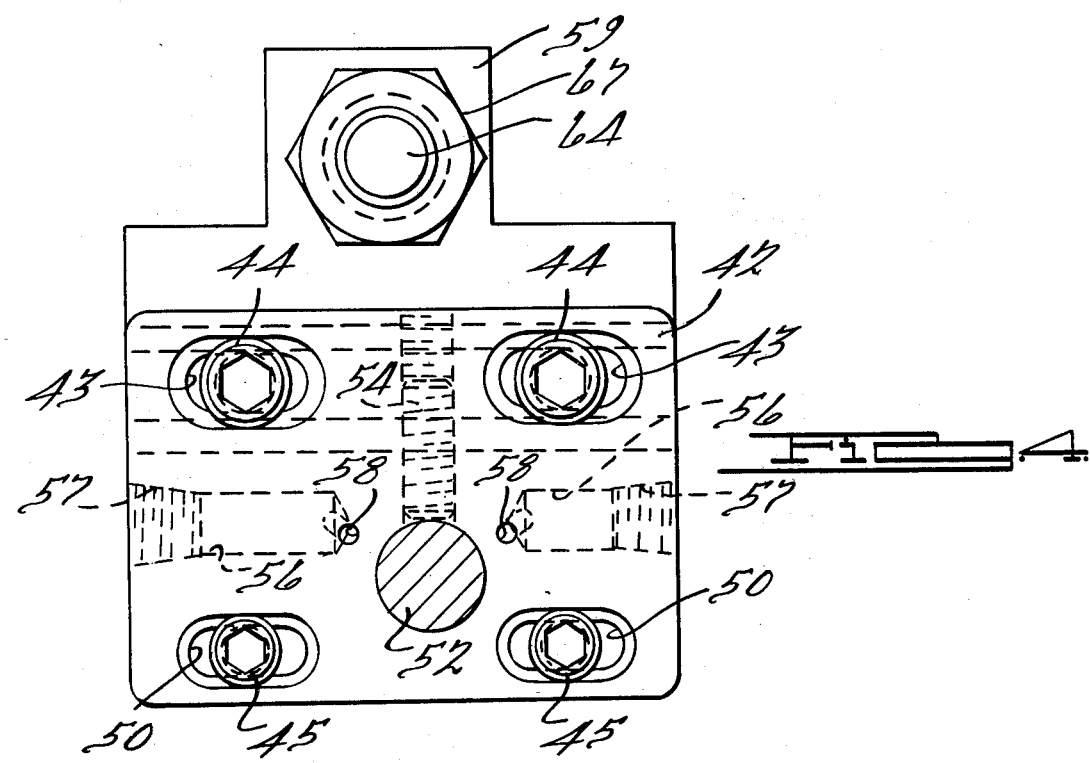

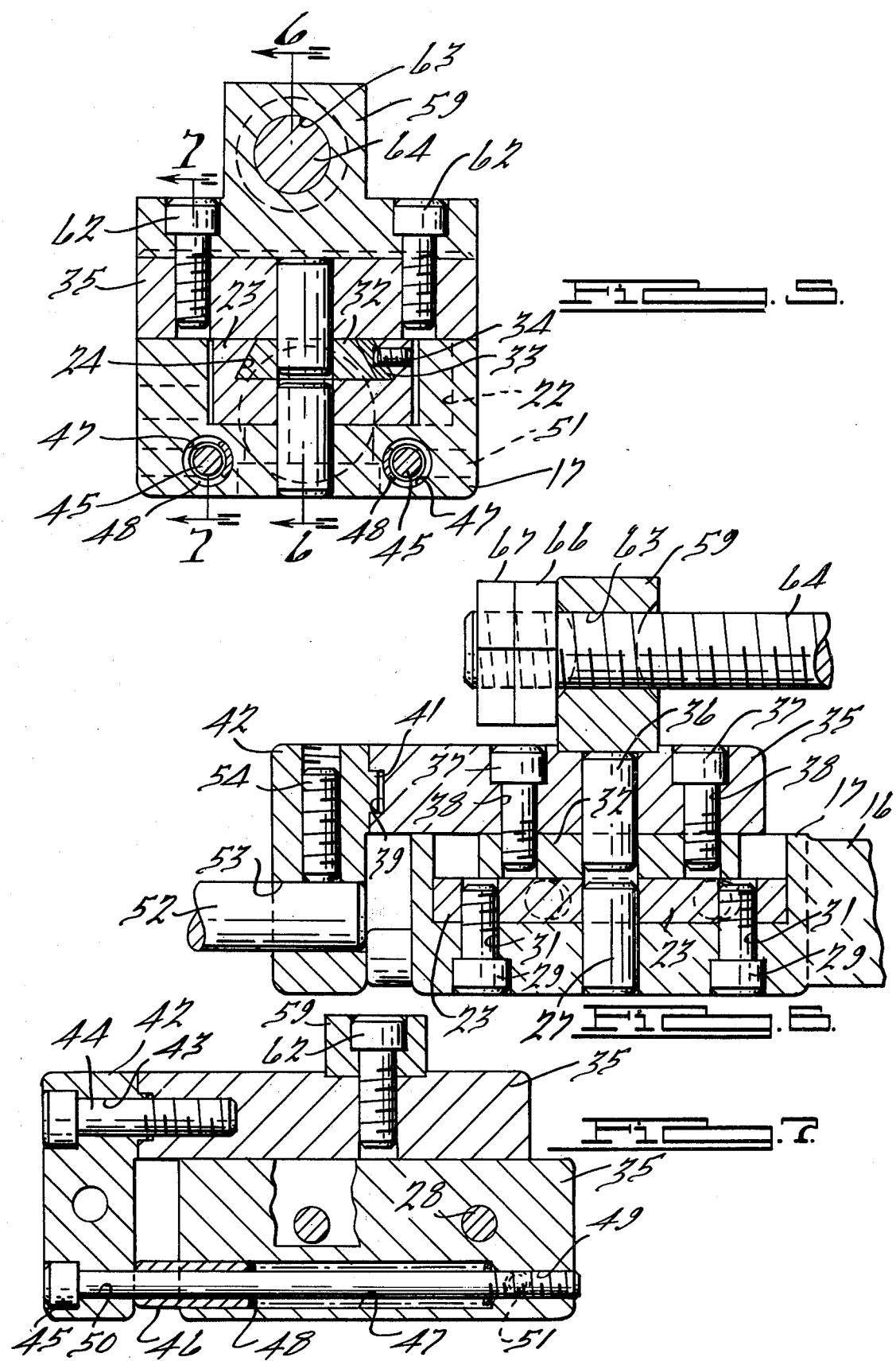

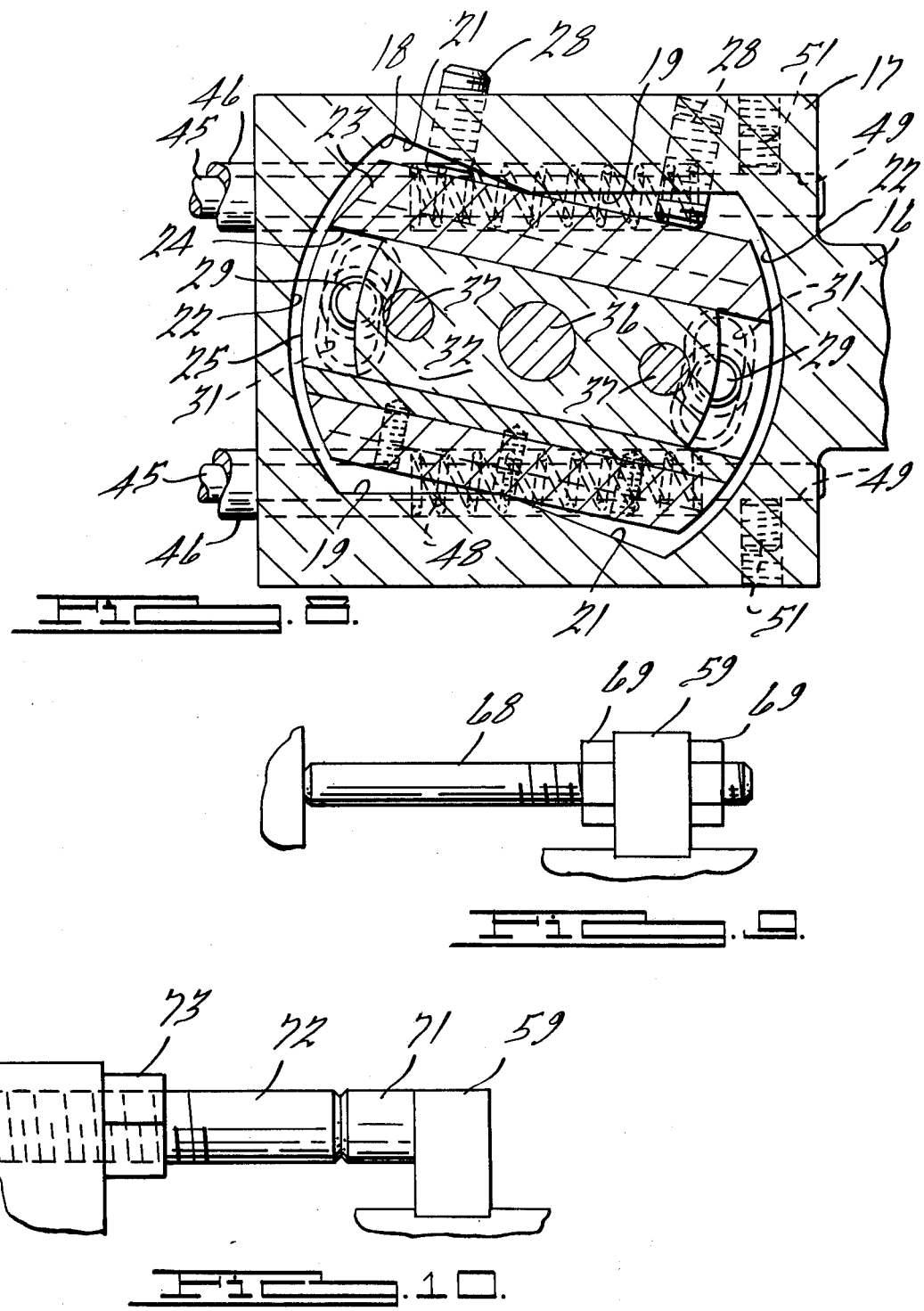

TOOL HOLDER

This invention relates to tool holding advancing devices, and particularly to a device for supporting and advancing a tool into a workpiece at a precise point and to a predetermined depth.

DESCRIPTION OF THE PRIOR ART

Reference may be had to the M. J. Schlitters U.S. Pat. No. 2,495,291, issued Jan. 24, 1950 for "Recessing Tool Holder." This patent covers a device somewhat similar to applicant's device for advancing the tool to accurately position it relative to a workpiece and thereafter to advance the tool into the workpiece to a predetermined depth.

SUMMARY OF THE INVENTION

The invention pertains to a shank having a head thereon in which a dovetail holder is supported for angular adjustment. A slide plate carries a dovetail slide which is supported in the dovetail holder. The slide plate is angularly adjustable relative to the slide so that it can be returned to a position parallel to the head after the holder is angularly adjusted. This permits the dovetail slide to be set at different angles relative to the amount of longitudinal movement of the slide plate so as to produce a desired depth of cut resulting from the lateral advancement of the slide. A tool supporting plate is secured to the end of the slide plate for adjustment laterally thereof so as to position the tool carried thereby a predetermined distance from the surface of the workpiece. A stop element is carried by the slide plate by which its advancement is interrupted to accurately locate the tool relative to the workpiece. The advancement of the slide thereafter produces a machining operation such as a recessing operation on the internal wall of a cylinder workpiece driven in rotation. Springs retain the slide stop plate and tool in stop position as the shank and head are initially retracted to withdraw the cutting tip from the workpiece before returning the stop plate and tool to its initial position.

BRIEF DESCRIPTION OF THE DRAWINGS

FIG. 1 is a view in elevation of a machine with a tool holder of the present invention mounted thereon;

FIG. 2 is an enlarged, broken view of the tool holder illustrated in FIG. 1;

FIG. 3 is a plan view of the structure illustrated in FIG. 2, as viewed from the point 3 thereof;

FIG. 4 is a sectional view of the structure illustrated in FIG. 2, taken on the line 4—4 thereof;

FIG. 5 is a sectional view of the structure illustrated in FIG. 2, taken on the line 5—5 thereof;

FIG. 6 is a sectional view of the structure illustrated in FIG. 5, taken on the line 6—6 thereof;

FIG. 7 is a sectional view of the structure illustrated in FIG. 5, taken on the line 7—7 thereof;

FIG. 8 is a broken sectional view of the structure illustrated in FIG. 2, taken on the line 8—8 thereof;

FIG. 9 is a broken view of structure, similar to that illustrated in FIG. 2, showing another form of stop means, and FIG. 10 is a view of structure, similar to that illustrated in FIG. 9, showing a still further form of stop means.

DESCRIPTION OF THE PREFERRED EMBODIMENT

While the tool holder of the present invention may be employed on any type of machine, it has special advantages when used on a screw machine wherein workpieces are progressively machined as they are advanced to stations having different tools of a series. In the present arrangement, a workpiece 11 is supported in a rotatable head 12 mounted on a spindle supporting portion 13 of the machine. A slide 14 is advanced toward the workpiece a predetermined distance during each cutting operation. The slide has a boss 15 thereon in which a shank 16 of the tool holder and feed mechanism of the present invention is supported. The shank 16 carries a rectangular head 17 containing a recess 18 having opposite parallel walls 19 from which parallel sloping walls 21 extend. The ends of the walls are joined by arcuate walls 22.

A slide holder 23 has a dovetail slot 24 and arcuate ends 25 of a width to be received within the recess 18 and to be angularly adjusted therein from the parallel side walls 19 to the parallel side walls 21. The slide holder 23 is accurately positioned within the recess on a dowel pin 26 extending therethrough and through the bottom of the head 17. The holder 23 is accurately positioned angularly about the dowel pin 27 by screws 28 which lock the holder in adjusted position. After being so adjusted, the slide holder 23 is secured against the bottom of the recess by tightening screws 29 which extend through arcuate slots 31 in the bottom portion of the head.

A dovetail slide 32 is mounted in the dovetail slot 24 of the slide holder 23 engaged on one side by a gib 33 adjustably secured in the dovetail slot 24 by a plurality of screws 34. A stop plate 35 has a dowel pin 36 therein which extends through the slide 32 in exact alignment with the dowel pin 27 carried by the slide holder 23 and head 17. A pair of screws 37 extend through arcuate slots 38 in the stop plate 35 struck on a radius from the center of the dowel pin 36 to permit the plate to be brought back to a position parallel to the head 17 after the slide holder 23 has been angularly adjusted. Thereafter, the plate 35 is retained in parallel relationship by tightening the screws 37.

The stop plate 35 has a slot 39 in the forward end in which a projecting rib 41 of a tool supporting plate 42 extends for lateral adjustment. The plate 42 has elongated apertures 43 therein at the top through which screws 44 extend for securing the tool supporting plate in fixed adjusted position on the stop plate 35. Screws 45 extend through elongated apertures 50 at the bottom of the plate 42 and through apertures 47 in the bottom portion of the head 17. The ends of the screws 45 are screwed into threads 49 at the ends of the apertures 47 where they are secured by screws 51. A plunger 46 and a spring 48 are mounted on the body of the screws 45 within the apertures 47 for urging the tool supporting plate 42 and stop plate 35 forwardly of the head 17 to the position illustrated in FIG. 7 where the movement is limited by the heads of the screws 45.

The tool supporting plate 42 has a tool shank or arbor 52 secured in an aperture 53 therein by a screw 54. The shank of the tool may have a fixed cutting tip 55 thereon, as illustrated in FIG. 3, or a cutting tool may be removably secured near the end of the arbor. The tool supporting plate 42 has coolant passageways 56 therein containing a pipe thread 57 at the outer end to which conduits for the coolant are secured. The inner end of the passageways 56 communicate with nozzle-like apertures 58 through which the coolant is directed in small streams on the cutting end of the tool and the surface of the workpiece adjacent thereto. A stop block 59 is secured in a slot 61 in the stop plate 35 and retained in fixed relation thereto by screws 62. The block has an aperture 63 therethrough through which a rod 64 extends. The rod has a swivel connection 65 to the machine and has a nut 66 on the free end which is adjustable on the thread of the rod for accurately stopping the block 59 and the stop plate 35 to position the cutting end of the tool relative to the workpiece 11. After adjust- the rod 64, it is retained in adjusted position by a locknut 67.

In FIG. 9, a slightly different stop arrangement is illustrated that wherein the stop block 59 has a stud 68 accurately adjusted thereon and retained in adjusted position by nuts 69. The end of the stud 68 abuts the machine during the forward movement of the tool holder and thereby accurately locates the tool relative to the work.

A similar stop arrangement is illustrated in FIG. 10 wherein the stop block 59 carries a head 71 of a stud which is threaded into an aperture in the block in alignment with the end of a stud 72 which is threaded into an aperture in the machine and locked in position by a nut 73. The stop arrangement by the rod 64, by the stud 68 and by the head 71 function in the same manner for stopping the advancement of the stop plate 35 to accurately locate the work relative to the tool and to permit it to shift laterally.

In operation, as the workpiece 11 is rotated, the slide 14 and boss 15 is advanced with the shank 16 and head 17 to move the cutting tip 55 forwardly. This movement will continue until the stop block 59 is retained against further movement whereupon the continued movement of the slide 14 and head 17 causes the dovetail slot 24 to advance over the slide 32 and thereby move the stop plate 35, tool supporting plate 42 and tool shank 52 laterally. This advances the cutting tip 55 into the workpiece to a depth controlled by the distance advanced by the slide holder 23 and the angularity of the slide 32. While the angularity of the slide holder 23 controls the feed of the tool, the angularity actually controls the depth of cut since the advancement of the head 17, after the stop block 59 has been engaged, is always the same amount.

Upon the reverse movement of the slide 14 and head 17, the springs 47 retain the stop plate 35 in forward "stop" position permitting the slot 24 to move over the slide 32 and retract the stop plate 35 and tool until the tool supporting plate 42 engages the heads of the screws 45. Thereafter, the tool, the tool supporting plate 42 and the stop plate 35 will move with the head 17 to retracted position away from the workpiece 11.

What is claimed is:

1. In a tool holder for advancing a cutting tip laterally of an advancing shank, a head on said shank having a recess, a slide holder within said recess for adjustment angularly therein, a dovetail slide in said holder, a stop plate adjustably supported on said slide, spring means biasing said stop plate forwardly of said head and shank, means for stopping said stop plate during its advancement to cause the slide and stop plate to stop and be advanced laterally as the slide holder and head continue to advance, means to angularly position said slide and slide holder in said recess, the stop plate and slide and the slide holder and head have aligned apertures, a dowel pin in the apertures in the stop plate and slide, a dowel pin in the apertures in the slide holder and head, and means for clamping said slide holder to the head and said slide to the stop plate after the adjustment thereof in said recess, the sides of said recess having portions which are parallel to each other along the direction of movement of the head, the remaining portions being parallel but at an angle to the first said portion.

* * * * *